US012734533B2

(12) United States Patent
Shade, Jr. et al.

(10) Patent No.: US 12,734,533 B2
(45) Date of Patent: Sep. 15, 2026

(54) SYSTEM FOR GENERATING TRACER PARTICLES

(71) Applicant: Microrite, Inc., San Jose, CA (US)

(72) Inventors: William L. Shade, Jr., Minneapolis, MN (US); Morgan Polen, Minneapolis, MN (US)

(73) Assignee: Microrite, Inc., San Jose, CA (US)

( * ) Notice: Subject to any disclaimer, the term of this patent is extended or adjusted under 35 U.S.C. 154(b) by 274 days.

(21) Appl. No.: 18/363,260

(22) Filed: Aug. 1, 2023

(65) Prior Publication Data

US 2024/0050964 A1 Feb. 15, 2024

Related U.S. Application Data

(60) Provisional application No. 63/370,896, filed on Aug. 9, 2022.

(51) Int. Cl.

| | |
|---|---|
| ***B05B 1/24*** | (2006.01) |
| ***B05B 9/04*** | (2006.01) |
| ***B05B 12/08*** | (2006.01) |
| ***B05B 15/63*** | (2018.01) |

(52) U.S. Cl.

CPC .................. *B05B 1/24* (2013.01); *B05B 9/04* (2013.01); *B05B 12/087* (2013.01); *B05B 15/63* (2018.02)

(58) Field of Classification Search

CPC ........... B05B 1/24; B05B 9/04; B05B 12/087; B05B 15/63; B05B 1/044; B05B 1/20; B05B 9/0416; B05B 12/006; B05B 12/085; A63J 5/025

USPC .............................................. 239/8, 68, 136

See application file for complete search history.

(56) References Cited

U.S. PATENT DOCUMENTS

2013/0140374 A1* 6/2013 Adams .................... B05B 12/14 239/8
2015/0014430 A1* 1/2015 Scully .................. B05B 7/1686 239/8

FOREIGN PATENT DOCUMENTS

KR 20160138636 A * 12/2016 .............. A63J 5/025
WO WO-2016100707 A1 * 6/2016 ........... B29B 7/7447

* cited by examiner

*Primary Examiner* — Qingzhang Zhou

(74) *Attorney, Agent, or Firm* — Levine Bagade Han LLP

(57) ABSTRACT

A vapor generating system for generating neutrally buoyant tracer particles to be used in air pattern analysis is disclosed, including a fluid reservoir configured for receiving a volume of fluid to be vaporized, a pump in fluid connection with the fluid reservoir, a heater in communication with the fluid reservoir, a controller unit in communication with the pump and the heater, the controller unit comprising a flow controller and a heater controller, and a flow sensor in communication with the fluid reservoir and the flow controller for measuring a fluid flow rate, wherein selection of a fluid type and vapor intensity configures the flow controller to actuate the pump to provide a predetermined fluid flow rate from the fluid reservoir and further configures the heater controller to actuate the heater to provide a predetermined heater temperature to the fluid at the predetermined flow rate.

28 Claims, 12 Drawing Sheets

SYSTEM FOR GENERATING TRACER PARTICLES

CROSS-REFERENCE TO RELATED APPLICATIONS

This application claims the benefit of priority to U.S. Prov. App. 63/370,896 filed Aug. 9, 2022, which is incorporated herein by reference in its entirety.

FIELD OF THE INVENTION

The present invention relates to methods and apparatus for generating neutrally buoyant tracer particles which are used for in situ air pattern analysis, such as smoke studies or air flow visualization.

BACKGROUND OF THE INVENTION

Airflow visualization studies are used to evaluate air patterns in medical product cleanrooms and barrier systems (RABS, isolators, pass-throughs and airlocks) that support aseptically produced, terminally sterilized and low bioburden product manufacturing.

The ISO 14644 series of standards apply to all industries, but additional considerations are required for the control of particulate and microbiological contamination in medicinal product cleanrooms. Air pattern analysis, or airflow visualization, is an expected test by regulatory bodies worldwide and currently appears to be a widely misunderstood test by manufacturers, equipment suppliers, and regulators.

How air moves through the cleanroom or clean zone determines its contamination control effectiveness. Because air is transparent, it is difficult to determine this contamination control effectiveness. Airflow visualizations allow for a visual representation of air movement in both unidirectional and non-unidirectional flow cleanrooms and barrier systems. Additionally, these studies allow for the analysis of the airflow at the interface between unidirectional and non-unidirectional areas.

A common method for observing airflows is the tracer particle injection method, which involves the observation and recording of the behavior of tracer particles that are injected or diffused into the air stream being tested. The accuracy of this method is dependent on the tracer particles faithfully following the air patterns, the tracer particles remaining visible long enough to allow for the analysis of the area being tested, the location of the tracer particle injection, and the method in which the tracer particles are injected into the air patterns being tested.

To maximize accuracy of the analysis, the tracer particles should be neutrally buoyant, stable, and suitably diffused or injected into the airstream. Neutrally buoyant means the tracer particles do not settle rapidly or rise rapidly after being released into an area with no airflow. Stable means the particles remain visible long enough to visualize the air patterns being tested. Suitably diffused or injected into the airstream means the tracer particles are introduced without altering, disturbing, or overpowering the air patterns being tested.

Other vapor generating systems generate particles that are not neutrally buoyant or that evaporate rapidly. Other vapor generating systems are not suitable to characterize air patterns in non-unidirectional flow cleanrooms.

The current state of the art would benefit from vapor generating systems that can produce tracer particles that are neutrally buoyant, stable, and suitably diffused or injected into the airstream.

SUMMARY OF THE INVENTION

A vapor generating system may include a fluid reservoir configured for receiving a volume of fluid to be vaporized, a pump in fluid connection with the fluid reservoir, a heater in communication with the fluid reservoir, a controller unit in communication with the pump and the heater, the controller unit comprising a flow controller and a heater controller, and a flow sensor in communication with the fluid reservoir and the flow controller for measuring a fluid flow rate, wherein selection of a fluid type and vapor intensity configures the flow controller to actuate the pump to provide a predetermined fluid flow rate from the fluid reservoir and further configures the heater controller to actuate the heater to provide a predetermined heater temperature to the fluid at the predetermined flow rate.

A variation of the vapor generating system may also include a first driver in communication with the pump and the flow controller, and the first driver may be a pulse-width modulation driver. This variation may also include a second driver in communication with the heater controller and the heater, and the second driver may also be a pulse-width modulation driver. The system may have an interface in communication with the controller unit. The interface may allow users to select a fluid type and a vapor intensity to produce a desired smoke, fog, or haze. The interface may also display information to a user, such as a light indicating whether the device is turned on, the time elapsed since the vapor generating system has been running, the fluid type selected, the vapor intensity selected, and other information. The system may include a manifold in communication with the fluid reservoir. The manifold may be a system of manifold tubes that are removably attachable to manifold connectors and which can be assembled in a variety of configurations and orientations. The system may include a plurality of sensors, including a current sensor, a bidirectional flow sensor, a pressure sensor, a temperature sensor, a tachometer, a level sensor, or other sensors. The current sensor may be used to measure the current through the heater and calibrate the heater and the heater controller. The bidirectional flow sensor may be used to measure the flow rate of the fluid as it exits the pump, to calibrate the flow controller and the pump, to communicate to the flow controller to update the speed of the pump in real time, and to determine whether air is present in the tube. The pressure sensor may be used to measure the pressure of the fluid as it exits the pump and to calibrate the flow controller and the pump. The temperature sensor may be used to measure the temperature of the fluid as it exits the heater and to calibrate the heater and the heater controller. The tachometer may be used to measure the rotational speed of the pump and to calibrate the pump and the flow controller. The controller unit may further comprise a receiver such that the system can communicate wirelessly with external devices such as smartphones or computers. The receiver may be configured to receive information from external devices and communicate that information to the controller unit, specifically to the flow controller and the heater controller. The receiver may also be configured to communicate information to an external device, such as the selected fluid type and vapor intensity.

A method of generating vapor may comprise receiving a selection by a user of a fluid type and a vapor intensity, actuating a pump in fluid connection with a fluid reservoir such that a fluid within the fluid reservoir is controlled via a controller having a flow controller to flow at a predetermined fluid flow rate based upon the selection, actuating a heater in communication with the fluid reservoir such that the heater is configured via the controller having a heater controller to provide a predetermined heater temperature based upon the selection, and measuring the fluid flow rate via a flow sensor in communication with the fluid reservoir and the flow controller while the fluid is vaporized at the predetermined fluid flow rate and the predetermined heater temperature.

In a variation of a method of generating vapor, actuating the pump may include activating a first driver, which may be a pulse-width modulation driver, in communication with the pump and the flow controller. In another variation, actuating the heater may include activating a second driver, which may be a pulse-width modulation driver, in communication with the heater and the heater controller. The selection may be received from an interface in communication with a controller unit. The fluid may be vaporized and distributed to an environment via a manifold in communication with the fluid reservoir. The method of generating vapor may also include measuring a current supplied to the heater using a current sensor in communication with the heater, measuring the fluid flow rate via a bidirectional flow sensor in communication with the fluid reservoir, communicating wirelessly with the controller via a receiver in communication with the controller, measuring a pressure of the fluid using a pressure sensor in communication with the fluid reservoir, measuring a temperature of the fluid using a temperature sensor in communication with the fluid reservoir, and measuring a level of the fluid using a level sensor in communication with the fluid reservoir.

A vapor generating system may comprise a fluid reservoir configured for receiving a volume of fluid to be vaporized, a pump in fluid connection with the fluid reservoir, a heater in communication with the fluid reservoir, and a controller unit in communication with the pump and the heater, the controller unit comprising a flow controller and a heater controller, wherein selection of a fluid type and vapor intensity configures the flow controller to actuate the pump to provide a predetermined fluid flow rate from the fluid reservoir and further configures the heater controller to actuate the heater to provide a predetermined heater temperature to the fluid at the predetermined flow rate.

BRIEF DESCRIPTIONS OF THE DRAWINGS

DETAILED DESCRIPTION OF THE INVENTION

A vapor generating system that can generate neutrally buoyant visible stable tracer particles used to create safe artificial smoke, fog, or haze for the purpose of visualizing air patterns, testing air cleanliness, or providing artificial smoke for various applications such as fire safety training, video productions, and theatrical productions and concerts is disclosed.

Figure 1:
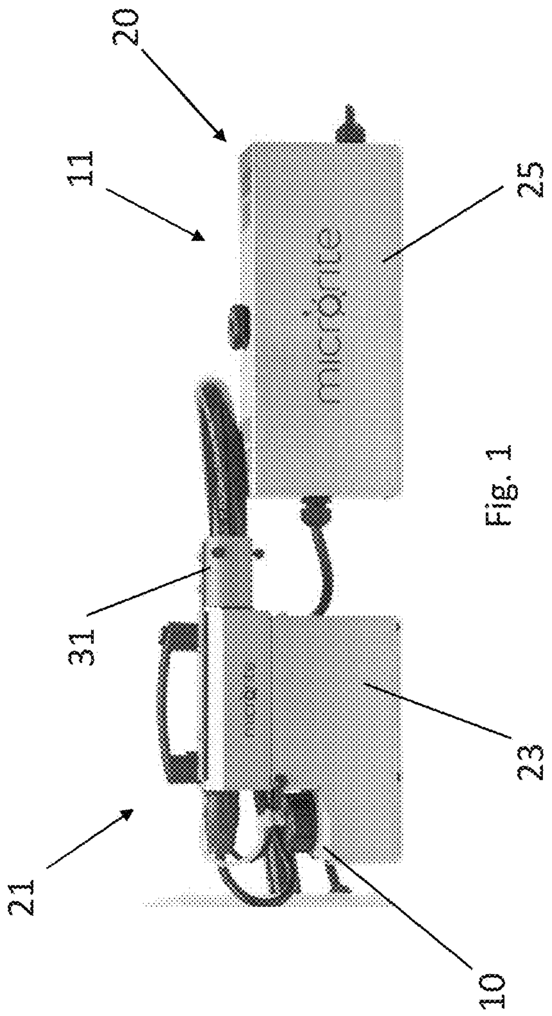
FIG. 1 shows an example of a vapor generating unit having a fluid reservoir, a controller unit, a vapor generating unit, a vapor generating unit housing, a controller unit housing, and an orifice.

FIG. 1 illustrates an example of a vapor generating system 11 which may comprise a vapor generating unit 21 and a controller unit 20 which may be coupled to the vapor generating unit 21. The controller unit 11 may contain the electronics which are programmable to control the vapor generating unit and may include various electrical components, for example, a first driver 40, a second driver 42, a flow controller 22, a heater controller 24, a flow controller calibration look-up table, and a heater controller calibration look-up table, some or all of which may be contained within a controller unit housing 25 and which are described in further detail below. The housing 25 of the controller unit 20 may be made of stainless steel or another metal as appropriate to provide protection to the components within. The controller unit housing 25 may also be made of any kind of plastic as appropriate.

The controller unit 20 may be integrated directly with the vapor generating unit 21 into a single housing while in other variations, the controller unit 20 may also be separated from the vapor generating unit 21. The controller unit 21 may also be removably detachable from the vapor generating unit 21. The controller unit 20 may be electrically configured to a vapor generating unit 21 while in other variations, the controller unit 20 may also be in electrical communication with the vapor generating unit 21 via wireless protocols, such as WiFi or Bluetooth. The controller unit 20 may contain a power source while in other variations, the controller unit 20 may also be in electrical communication with an external power source, such as a wall outlet.

The vapor generating unit 21 may contain a fluid reservoir 10, which may be contained in a vapor generating unit housing 23. The vapor generating unit 21 may have an outlet or orifice 31 in fluid communication with the fluid reservoir, configured for the generated vapor, smoke, fog, or haze to exit. The vapor generating unit 21 may also contain a heater 16, a heater coil 17, a pump 12, and a flow sensor 14, some or all of which may also be contained in the vapor generating unit housing 23. The vapor generating unit 21 may contain a power source or may be in electrical communication with an external power source, such as a wall outlet. The vapor generating unit housing 23 may be made of stainless steel or another metal as appropriate. The vapor generating unit housing 23 may also be made of any kind of plastic as appropriate.

The fluid reservoir 10 may be a container which is configured to contain a fluid to be vaporized into the vapor, fog, smoke, or haze and may be removably attached to the vapor generating unit 21. The fluid reservoir 10 may be replaceably detachable or it may be integrated with the vapor generating unit 21. In either case, the fluid reservoir 10 may have a removably securable cap to allow the fluid reservoir 10 to be filled and refilled with fluid. The fluid reservoir 10 may be configured in any variety of shapes such as cylindrical in shape, but may also take a conical, pyramidical, or other shape as appropriate and the fluid reservoir 10 may be made of stainless steel or another metal as appropriate and may also be made of any kind of plastic as appropriate. The fluid reservoir 10 may be clear to allow visibility of the fluid within the fluid reservoir 10.

While the fluid reservoir 10 may be integrated directly with a pump 12, it may also be separated from the pump 12, but in fluid communication with it, e.g., via a tube 18, which may further optionally include a valve to control the flow of fluid to and from the pump 12.

The orifice 31 may comprise a hole, tube, or any other opening that allows fog, smoke, or haze to exit the vapor generating unit 21. The orifice 31 may further include any number of detachable securement features such as fasteners, detents, latches, grooves, etc., or some other attachment mechanism to allow the vapor generating unit 21 to be placed into fluid communication with a channel, tubing, or manifold 80 (as shown below in further detail), etc.

Figure 2:
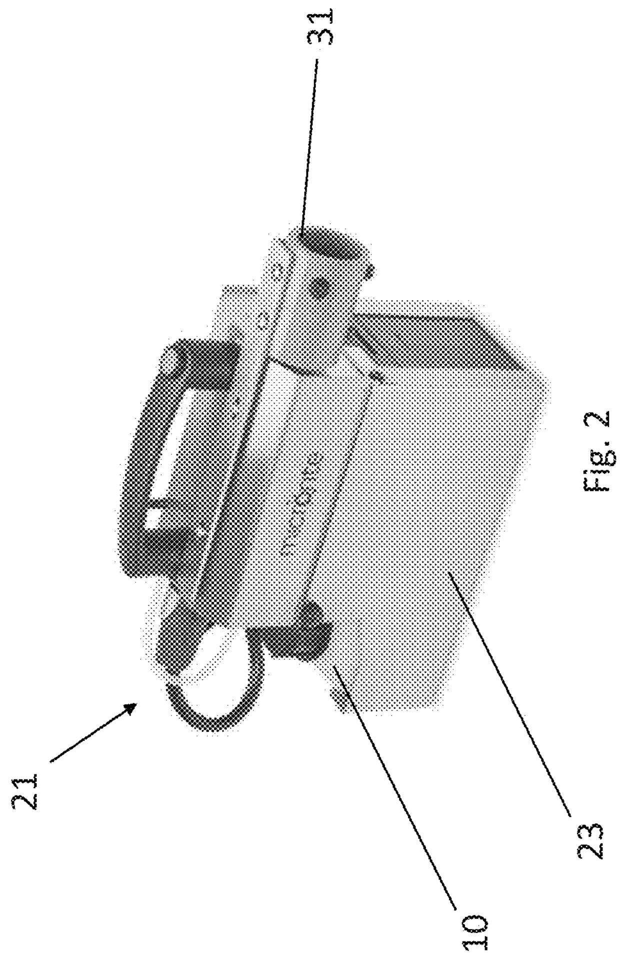
FIG. 2 shows an isometric view of a vapor generating unit having a fluid reservoir, vapor generating unit housing, and an orifice.

FIG. 2 illustrates an isometric view of a vapor generating unit 21 having a fluid reservoir 10, vapor generating unit housing 23, and an orifice 31.

Figure 3:
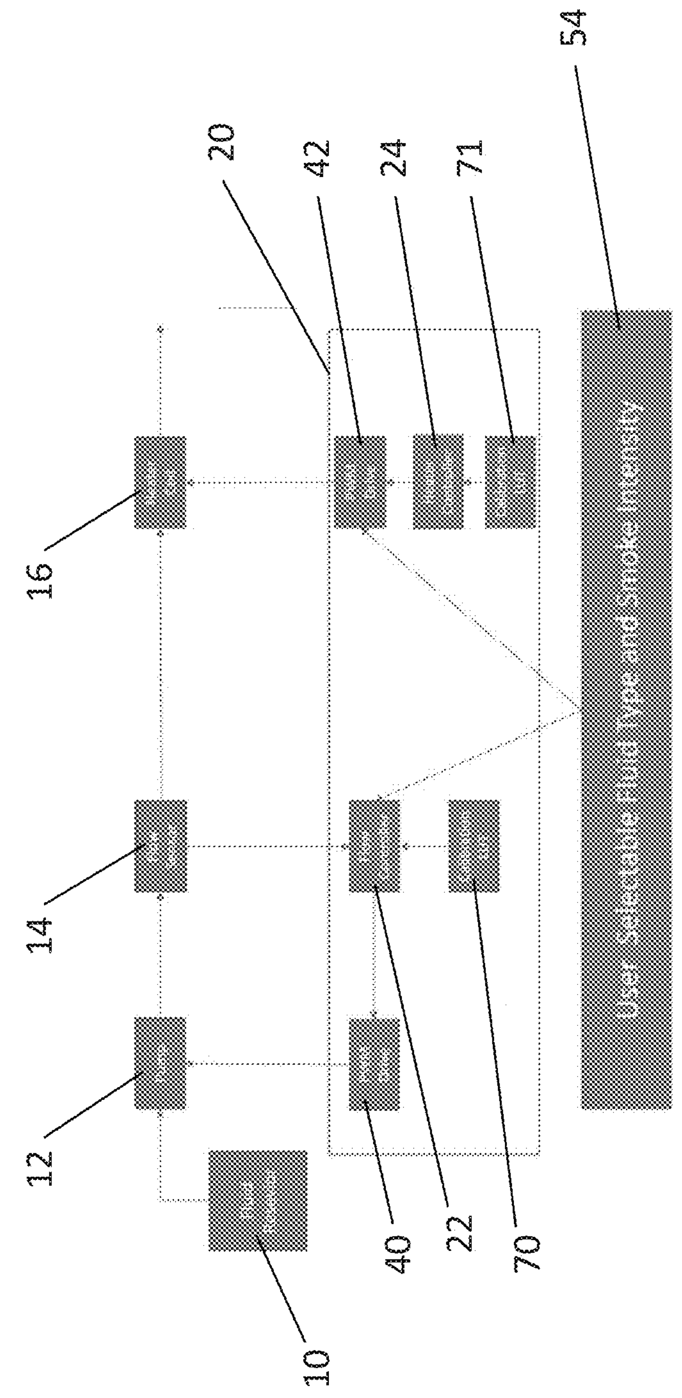
FIG. 3 shows a schematic illustration of a controller unit having a flow controller, a heater controller, a first driver, a second driver, and calibration look-up tables, the controller unit in communication with a pump, a heater coil and a flow sensor, which are in communication with a fluid reservoir.

FIG. 3 illustrates a schematic illustration of one variation of a controller unit 20 which may include at least some of the components such as a flow controller 22, a heater controller 24, a first driver 40, a second driver 42, a flow controller calibration look-up table 70, and a heater controller calibration look-up table 71, the controller unit 20 in communication with a pump 12, heater 16 and flow sensor 14, which are in communication with a fluid reservoir. The operation of the system 11 is described in further detail below.

The vapor generating system 11 may have two alternative modes, a calibration mode used for initially calibrating the system 11 and a control mode used for operating the system 11 in use. Calibration mode may include a flow controller calibration process where the calibration may include the pump 12 being set at an initial predetermined speed such that the initial flow rate of the fluid is a specified value. Then, the flow sensor 14 may produce an analog-to-digital value for that specified flow rate. For example, the analog-to-digital value could be measured in the dimensions volume divided by time, such as milliliters per minute. Repeating this process for multiple flow rates may yield an array of analog-to-digital values for different flow rates, which may be saved in the flow controller calibration look-up table (LUT) 70. Calibration mode may include a flow sensor calibration process where the pump speed can be varied until the volumetric flow rate is at a specified value based on measurements taken. For example, measurements may be taken using a graduated cylinder and a timer or any other measurement instruments. At that the measured volumetric flow rate, the flow sensor analog-to-digital value may be recorded and the process may be repeated thereby producing a LUT of flow sensor values for volumetric flow rates. Another variation may include determining the flow sensor readings for various corresponding volumetric flow rates so the system can then control the first driver 40 setting so that the targeted flow sensor 14 reading is achieved. The user can then select that volumetric flow setting to ensure that the instruments are reproducible such that each unit produces the same volumetric flow rate for each user setting. Calibration mode is described in greater detail during the discussions of the flow controller 22 and heater controller 24.

Calibration mode may also include a heater controller calibration process. For this calibration, the heater 16 may be set to the vaporization temperature for a particular solution. Initially, the vaporization temperature may be set to a predicted temperature at which the fluid in the fluid reservoir will vaporize. Then, the pump 12 may be set to a certain speed such that the fluid reaches the heater 16 and begins to vaporize. If fluid drips from the heater 16 or from the orifice 31, then the vaporization temperature for that solution should be increased. If the volume of fog, smoke, or haze produced does not appear to be maximized, or if the heater 16 produces a burning smell, then the vaporization temperature for that solution should be decreased. Repeating this process for multiple fluid types may yield an array of vaporization temperatures for different fluid types, which may be saved in the heater controller calibration look-up table (LUT) 71. Calibration mode is described in greater detail during the discussions of the flow controller 22 and the heater controller 24.

Depending upon the type of fluid used, parameters in fluid characteristics such as viscosity or boiling point temperature may vary between different fluid types. Hence, the calibration look-up table 70 for determining the appropriate pump speed and calibration look-up table 71 for determining the heater temperature may be adjusted accordingly depending upon the type of fluid used. For example, a fluid have a relatively higher or lower viscosity may require a relatively higher or lower pump speed and/or higher or lower coil temperature in which case the values of the look-up tables 70, 71 may be determined for each individual fluid type and applied depending upon the fluid used. Alternatively, standard look-up tables 70, 71 may be generated and a correction factor may be applied to the look-up tables 70, 71 depending upon the fluid type.

Figure 6:
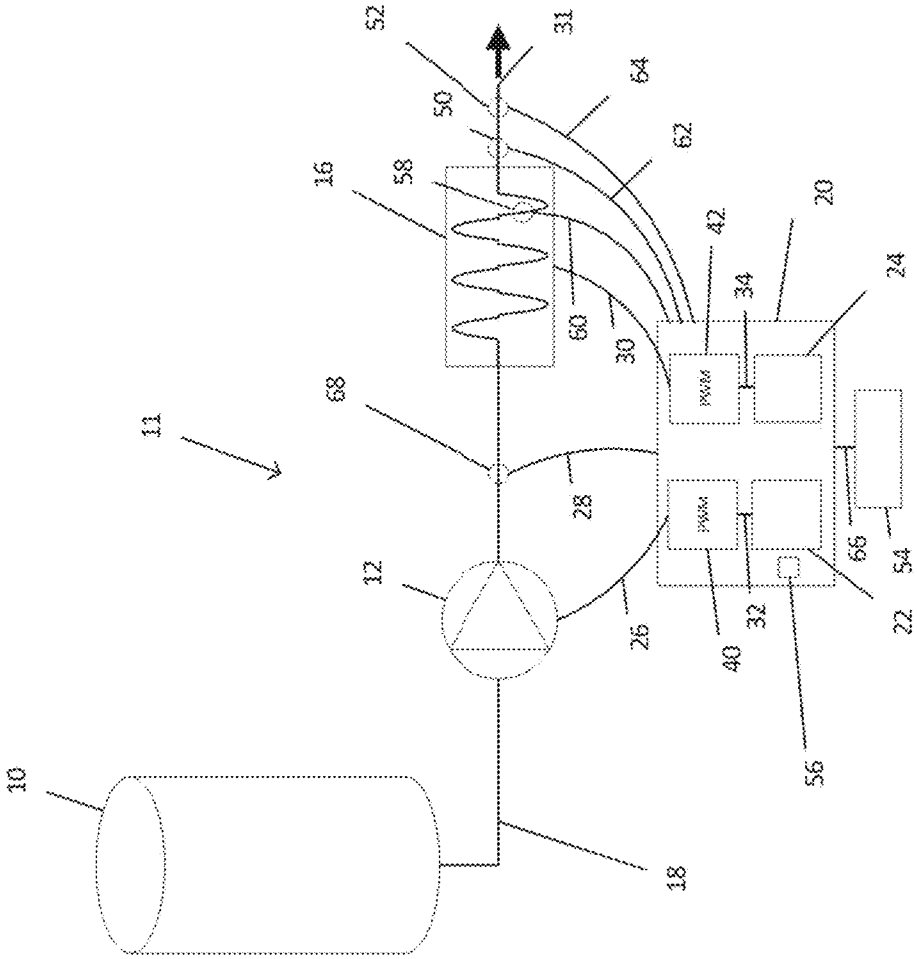
FIG. 6 shows a schematic illustration of a vapor generating unit having a first driver in communication with the flow controller and the pump, a second driver in communication with the heater controller and the heater, an interface, a receiver, a temperature sensor, a pressure sensor, and a current sensor.

Control mode may comprise the process through which the system 11 is used to produce a desired smoke, fog, or haze in use. In this mode, the user may provide an input through the interface 54. Then, the interface 54 may communicate the user input to the flow controller 22. Alternatively, the user may provide input to the receiver 56 (as shown in FIG. 6) within the control unit 20 from an external device, e.g., a smartphone, tablet, or computer, etc., or through a wireless connection such as WiFi or Bluetooth. Then, the receiver 56 may communicate the user input to the flow controller 22, the heater controller 24, or the controller unit 20. The flow controller 22 may reference the flow controller calibration look-up table 70 to communicate with the first driver 40 (e.g., a pulse-width-modulation or PWM driver) to set the pump 12 to a speed that corresponds to the user input. The flow controller 22 may then, in real-time, collect information from the flow sensor 14, such as the fluid flow rate. This information may be used to change the pump speed such that the fluid flow rate received from the flow sensor 14 tracks the user input.

Alternatively, control mode may operate without the use of a flow sensor 14. In this alternative control mode, the user may provide an input through the interface 54. Then, the interface 54 may communicate the user input to the flow controller 22. Alternatively, the user may provide input to the receiver 56 within the control unit 20 from an external device, e.g., a smartphone, tablet, or computer, etc., through a wireless connection such as WiFi or Bluetooth. Then, the receiver 56 may communicate the user input to the flow controller 22, the heater controller 24, or the controller unit 20. The flow controller 22 may communicate to the flow controller 22 to actuate the pump 12 to produce a flow rate that correlates to the user input.

Alternative calibration and control modes may include using a flow sensor 14 in the calibration process as described above, but not using a flow sensor 14 in the control mode. For example, the flow sensor 14 may be removably detachable from the flow controller 22 and the controller unit 20. Now, the flow sensor 14 would only be used in the calibration mode to create the flow controller calibration look-up table 70. When the control unit 20 is in the control mode, the flow sensor 14 can be removed from the vapor generating system 11. In this alternative control mode, the flow controller 22 may reference the flow controller calibration look-up table 70 to communicate with the first driver 40 to set the pump 12 to a speed that corresponds to the user input.

The vapor generating system 11 may further comprise a tachometer (not shown) which may be in communication with the pump 12 and may be used to measure the rotational speed of the pump 12. The tachometer may be used in addition to, or as an alternative to, the flow sensor 14 in the control and calibration modes. In an alternative calibration mode, the tachometer may produce an analog-to-digital value for a particular pump speed. This may be repeated for multiple speeds to produce an array of analog-to-digital values for different pump speeds, which may be saved in the flow controller calibration look-up table 70. In an alternative control mode, user input may be communicated to the controller unit 20 using the interface 54 or the receiver 56, as described previously. The flow controller 22 may reference the flow controller calibration look-up table 70 to communicate with the first driver 40 to set the pump 12 to a speed that corresponds to the user input. The flow controller 22 may then, in real-time, collect information from the tachometer, such as the rotations per minute of the pump 12. This information may be used to change the pump speed such that the rotations per minute of the pump 12 is updated in real-time to correspond to the rotations per minute saved in the flow controller calibration table 70 that correspond to the user input.

The interface 54 may be in electrical communication with the flow controller 22 and the heater controller 24. The interface 54 may comprise a screen displaying one or more fluid types and one or more levels of smoke intensity for a user to select from. The interface may be a touch screen or any other interface type which allows for the user to interact with the different options and features presented, for example, the interface may have buttons, dials, switches, or other features allowing the user to select one or more characteristics of the fog, smoke, or haze. The interface may further comprise lights, which could be LEDs or other types of lights, to indicate to the user that the vapor generating system 11 is turned on, or that the vapor generating system 11 is overheating, or that the fluid reservoir 10 is running out of fluid, or any other kind of information about the operation of the vapor generating system 11. The interface 11 may display information to the user such as the operating temperature of the heater 16, the speed of the pump 12, the elapsed time that the vapor generating system 11 has been producing fog, smoke, or haze, information from the flow controller calibration look-up table 70 or heater controller look-up table 71, or other information relevant to the operation of the system 11. The interface 54 may allow the user to select between a calibration and a control mode and may also allow the user to manually control the speed of the pump 12 and the heater 16, if so desired. The interface 54 may optionally have an emergency shut-down button or feature included as a fail-safe feature.

The flow controller calibration look-up table 70 may comprise data correlating speeds of the pump 12 to outputs produced by the flow sensor 14. The flow controller calibration look-up table 70 may be created through the flow controller calibration process. The flow controller calibration look-up table may also be provided from external data. In an alternative embodiment, the flow controller calibration look-up table 70 may comprise data correlating speeds of the pump 12 to outputs produced by another sensor, such as a tachometer (not shown), which may be rotations per minute of the pump 12. In another alternative embodiment, the flow controller calibration look-up table 70 may comprise data correlating speeds of the pump 12 to outputs produced by another sensor, such as a pressure sensor 52, which may be the pressure of the fluid as it leaves the pump 12. The flow controller calibration look-up table 70 may be created or updated when the system 11 is in calibration mode. The flow controller calibration look-up table 70 may also be created or updated by manually entering data.

The heater controller calibration look-up table 71 may comprise data correlating fluid types to the vaporization temperature for each fluid type. The heater controller calibration look-up table 71 may be created by entering vaporization temperatures for individual fluid types. The heater controller calibration table 71 may be provided from external data. The heater controller calibration look-up table 71 may be created or updated when the system 11 is in calibration mode. The flow controller calibration look-up table 71 may also be created or updated by manually entering data.

The controller unit 20 may comprise a flow controller 22 in electrical communication with a flow controller calibration look-up table (LUT) 70, a first driver 40, a flow sensor 14, and an interface 54. In a calibration mode, the flow controller 22 may be configured to communicate to the first driver 40 to actuate the pump 12 at a certain speed, receive information from the flow sensor 14 that correlates to that pump speed, such as the flow rate, write the correlation between the particular pump speed and the corresponding information, which may be a flow rate, to the flow controller calibration look-up table 70, and repeat the process for various pump speeds. In an alternative embodiment, the flow controller 22 may be configured to communicate to the first driver 40 to actuate the pump 12 at a certain speed, receive information from a sensor, which may be a tachometer (not shown), that correlates to that pump speed, such as the rotations per minute of the pump, write the correlation between the particular pump speed and the corresponding information, which may be rotations per minute, to the flow controller calibration look-up table 70, and repeat the process for various pump speeds.

In an alternative embodiment, the flow controller 22 may be configured to communicate to the first driver 40 to actuate the pump 12 at a certain speed, receive information from a sensor, which may be a pressure sensor 52, that correlates to that pump speed, such as the fluid pressure as the fluid exits the pump, record the correlation between the particular pump speed and the corresponding information, which may be the fluid pressure as the fluid exits the pump, to the flow controller calibration look-up table, and repeat the process for various pump speeds. In each of these alternative embodiments, the flow controller 22 may set each pump speed based on input from the interface 54. The flow controller 22 may alternatively set each pump speed based on a range of preconfigured pump speeds. The flow controller 22 may alternatively set each pump speed based on information from a receiver 56. In a control mode, the flow controller 22 may be configured to receive input from the interface 54. The flow controller 22 may also be configured to receive input from a receiver 56. The flow controller may communicate to the first driver 40 to actuate the pump 12 based on input from the interface 54 or the receiver 56. The flow controller may reference the flow controller look-up table 70 to set the pump to a certain speed that correlates to the input. When the pump 12 is actuated, the flow controller 22 may receive information from the flow sensor 14, which may be the fluid flow rate as the fluid exits the pump 12. The flow controller 22 may compare the information from the fluid flow sensor to the information in the calibration look-up table for the pump speed that correlates to the input from the interface 54 or the receiver 56. The flow controller 22 may then adjust the speed of the pump 12 as necessary such that the information from the flow sensor 14 more closely resembles the information stored in the flow controller calibration look-up table 70 that correlates to the input from the interface 54 or the receiver 56. In an alternative control mode, the flow controller 22 may be configured to actuate the pump without using a flow sensor 14. In this embodiment, the flow controller 22 may actuate the pump 12 at a certain speed based on input from the interface 54 or the receiver 56, but not change the pump speed based on information from a flow sensor 14. In another alternative control mode, the flow controller 22 may change the pump speed based on information from another type of sensor, such as a tachometer (not shown), or a pressure sensor 52. In these embodiments, the flow controller calibration look-up table 70 would store information correlating the pump speeds to information received from the sensor, which may include the rotations per minute of the pump in the case of a tachometer, or the pressure in the case of a pressure sensor 52.

The controller unit 20 may further comprise a heater controller 24 in electrical communication with a heater controller calibration look-up table 71, a second driver 42 (e.g., a pulse-width-modulation or PWM driver), a heater 16, and an interface 54. In a calibration mode, the heater controller 24 may be configured to communicate to the second driver 42 to actuate the heater 16 at a certain temperature. That temperature may correlate to a predicted vaporization temperature for the particular fluid type that is in the fluid reservoir 10. The heater controller 24 may be configured to receive information from the interface 54 or the receiver 56 to determine that temperature. When the pump 12 is actuated and fluid is flowing to the heater 16, the fluid should begin vaporizing into fog, smoke, or haze as it exits the heater 16 and through the orifice 31. The user may then observe the vapor generating system 11 and the fog, smoke or haze that exits the system. If the fluid is in liquid form as it exits the heater, this may be visual indicator that the fluid is not thoroughly heating at the given flow rate to the appropriate temperature and the temperature for that particular fluid type can be increased until the fluid no longer exits the heater in liquid form. If the vapor generating system is overheating, which may be evidenced by a burning smell, the temperature for that particular fluid type can be decreased. The heater controller 24 may be configured to receive input from the interface 54 or the receiver 56 based on whether the user wishes to increase or decrease the vaporization temperature. The heater controller 24 may also be configured to receive information from the interface 54 or the receiver 56 when the user decides that the vaporization temperature for that fluid type is idealized. This may occur when the vapor generating system 11 produces a maximum amount of fog, smoke, or haze without overheating the heater 16 or the heater coil 17. The heater controller 24 may then communicate to the heater controller calibration look-up table 71 the correlation between the fluid type and the user selected vaporization temperature.

In an alternative embodiment, the vapor generating system 11 may further comprise a current sensor 58, which may be in electrical communication with the heater 16 and the heater controller 24. In this embodiment, a calibration mode may further comprise the use of the current sensor 58. In this calibration mode, the heater controller 24 may be configured to communicate to the second driver 42 to actuate the heater 16 at a specific temperature, receive information from the current sensor 58, which may be the current through the heater 16, that correlates to that temperature, write the correlation between the temperature and the current sensor information to the heat controller calibration look-up table 71, and repeat the process for various temperatures.

In a control mode, the heater controller 24 may be configured to receive information from the interface 54 or the receiver 56. The heater controller 24 may then compare that information to the information saved in the heater controller calibration look-up table 71. Using the heater controller calibration look-up table, the heater controller 24 may then communicate to the second driver 42 to actuate the heater 16 to the vaporization temperature that correlates to the fluid type in the fluid reservoir.

The pump 12 may be in fluid communication with the fluid reservoir 10, the flow sensor 14, and the heater coil 16 via a tube 18 and electrical communication with the first driver 40. The pump 12 may be configured to receive fluid from the fluid reservoir 10 and produce a fluid flow rate within the tube 18.

The flow sensor 14 may be in fluid communication with the fluid reservoir 10 and electrical communication with the flow controller 22. The flow sensor 14 may be configured to take measurements of the fluid, which may include the fluid flow rate. The flow sensor 14 may be configured to communicate those measurements or other information to the flow controller 22. The flow sensor 14 may be configured to continuously or repeatedly provide measurements or information to the flow controller 22 such that the flow controller 22 can update the speed of the pump 12 via the first driver 40 continuously or periodically, in real-time while the pump 12 is actuated.

The heater 16 may be in fluid communication with the fluid reservoir 10 and the orifice 31 and electrical communication with the second driver 42. The heater 16 may further comprise a heater coil 17 which is actuated by the second driver 42 and is further configured to heat the fluid from the fluid reservoir 10 as it passes through the heater 16 at the predetermined flow rate to vaporize the fluid into a fog, smoke, or haze. The heater 16 may then be configured to pass that fog, smoke, or haze to the orifice 31 to exit the vapor generating system 11.

The first driver 40 may be in electrical communication with the flow controller 22 and the pump 12 and may be a pulse-width modulation driver or other type of driver. The first driver 40 may also be configured to receive information from the flow controller 22 and convert that information into an output, which may be a pulse-width modulation value, and communicate that output to the pump 12 to produce a flow rate in fluid from the fluid reservoir 10.

The second driver 42 may similarly be in electrical communication with the heater controller 42 and the heater coil 17 and may also be a pulse-width modulation driver or other type of driver. The second driver 42 may also be configured to receive information from the heater controller 24 and convert that information into an output, which may be a pulse-width modulation value, and communicate that output to the heater 16 to produce heat such that the fluid from the fluid reservoir 10 vaporizes into a smoke, fog, or haze.

Figure 4:
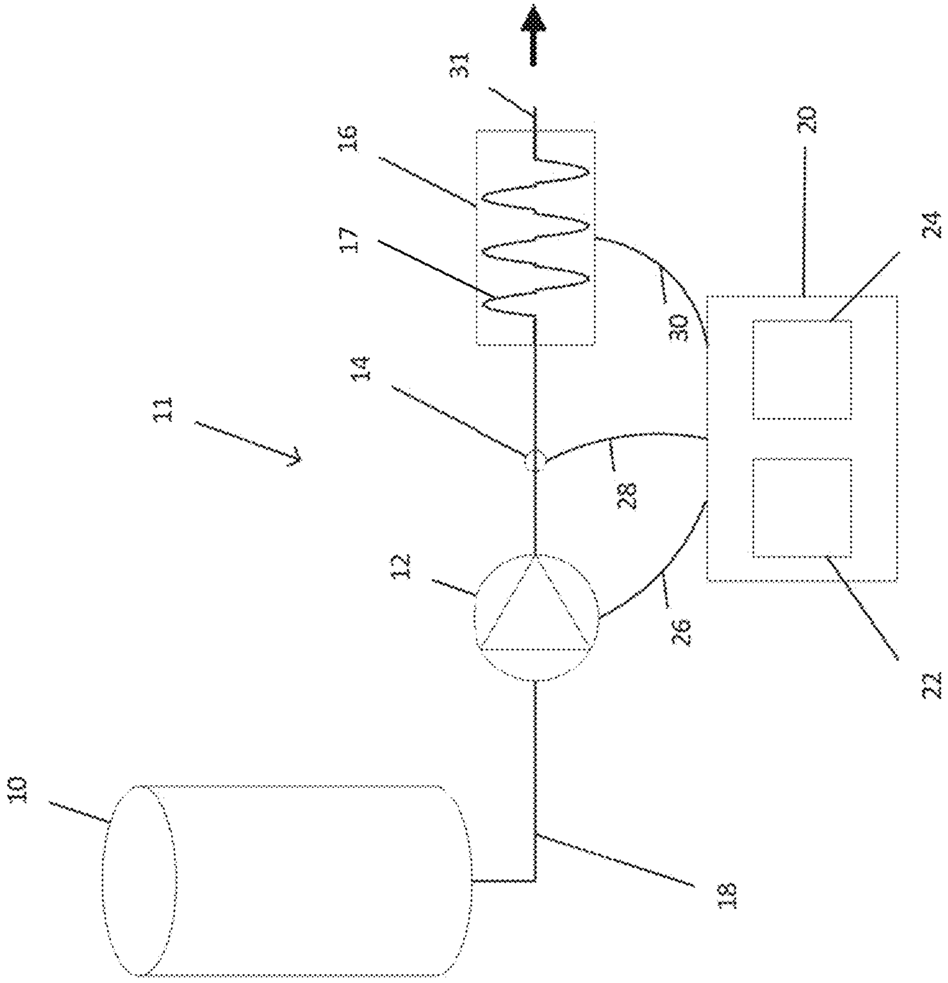
FIG. 4 shows a schematic illustration of a vapor generating unit having a flow controller and a heater controller, a fluid reservoir, a pump, a flow sensor, and a heater.

FIG. 4 shows a schematic illustration of another variation of a vapor generating unit having a flow controller 22 and a heater controller 24 within a common controller unit 20. The fluid reservoir 10 and the pump 12 may be in fluid communication via a fluid channel such as a length of tubing 18. The pump 12 and heater 16 may also be in fluid communication via a fluid channel such as a length of tubing 18. The flow sensor 14 may be in fluid communication with the tube 18 such that the flow sensor 14 can measure the flow rate of the fluid passing through the tube 18.

The pump 12 and the controller unit 20 may be in electrical communication via an electrical conductor 26 such as a wire or cable and the flow sensor 14 and the controller unit 20 may be in electrical communication via an electrical conductor 28 such as a wire or cable. Likewise, the heater 16 and the controller unit 20 may be in electrical communication via an electrical conductor 30 such as a wire or cable.

Alternatively, the pump 12, the flow sensor 14, and the heater 16 may be in electrical communication with the controller unit via a wireless connection, such as a WiFi or Bluetooth connection. In this embodiment, the flow controller 22 may be in direct communication with the pump 12 without the use of a first driver 40. Similarly, the heater controller 24 may be in direct communication with the heater 26 without the use of a second driver 42. In an alternative embodiment, the flow controller 22 and the heater controller 24 may be in communication with the controller unit 20. The pump 12, the flow sensor 14, and the heater 16 may also be in communication with the controller unit 20. The flow controller 22 and the heater controller 24 may be configured to communicate with the pump 12 and the heater 16 via the controller unit. Similarly, the flow sensor 14 may be configured to communicate with the flow controller via the control unit 20. In an alternative embodiment, the information that would normally be saved in the flow controller look-up table 70 and the heater controller look-up table may be saved directly into the flow controller 22 and the heater controller 24, respectively.

Figure 5:
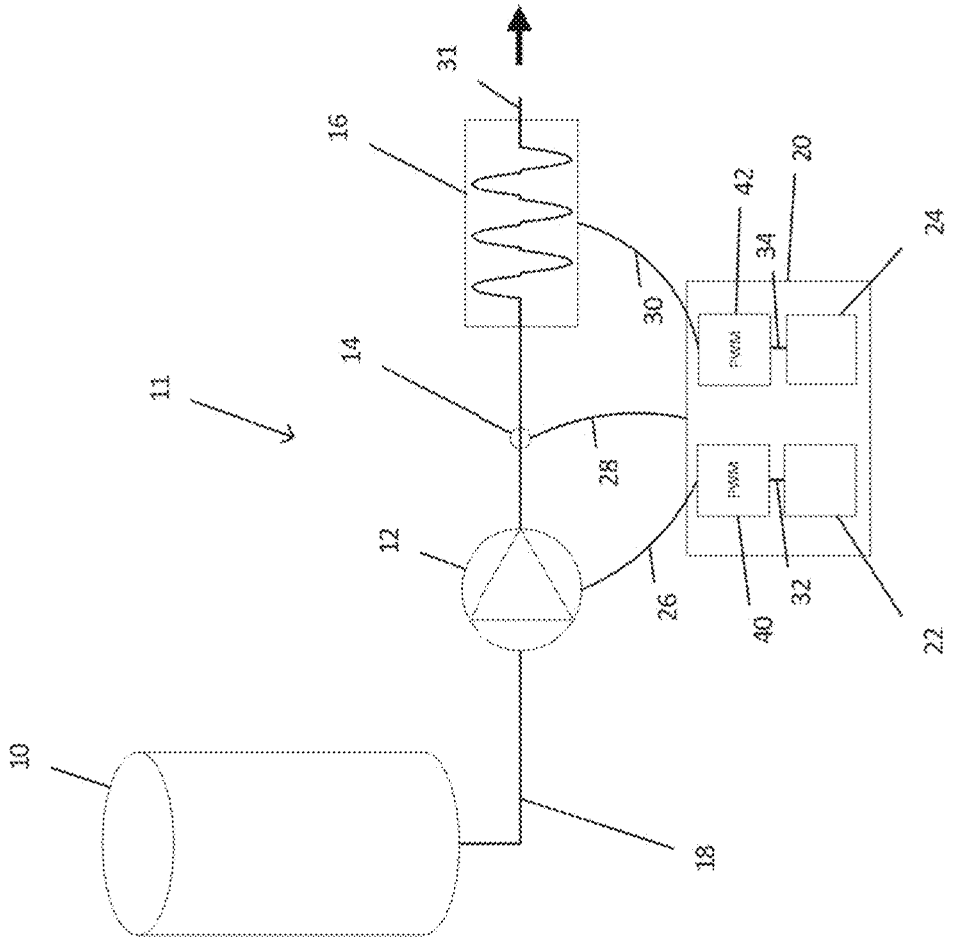
FIG. 5 shows a schematic illustration of a vapor generating unit having a first driver in communication with the flow controller and the pump and a second driver in communication with the heater controller and the heater.

FIG. 5 shows a schematic illustration of another variation of a vapor generating unit having a first driver in communication with the flow controller and a second driver in communication with the heater controller. The flow controller 22 and the first driver 40 may be in electrical communication via an electrical conductor 32 such as a wire or cable and the heater controller 24 and the second driver 42 may be in electrical communication via an electrical conductor 34 such as a wire or cable. The flow controller may be in communication with the first driver, or the heater controller may be in communication with the second driver via a wireless connection, such as a WiFi or Bluetooth connection.

FIG. 6 shows a schematic illustration of another variation of a vapor generating unit 11 having a first driver in communication with the flow controller 40, a second driver in communication with the heater controller 42, an interface 54, a receiver 56, a temperature sensor 50, a pressure sensor 52, and a current sensor 58. The controller unit may further comprise a receiver 56 which may be configured to communicate wirelessly with an external device, such as a smartphone, table, or a computer, etc., which may be located remotely from the controller unit. The wireless connection may be a WiFi Bluetooth, or other wireless connection. The receiver 56 may be configured to wirelessly receive input from and/or to an external device and may be in wireless or wired communication with the flow controller 22 and the heater controller 24. The receiver 56 may also receive input from a user such as the fluid type and desired smoke intensity. The receiver 56 may then communicate that information to the flow controller 22 and the heater controller 24 to communicate to the first driver 40 and second driver 42 to actuate the pump 12 and heater 16, respectively, to produce the smoke, fog, or haze. As the receiver 56 may also communicate information to the external device, data or parameters such as the temperature of the heater coil 17, the flow rate produced by the pump 12, whether the vapor generating system 11 is turned on, the amount of fluid in the fluid reservoir 10, the pressure of the fluid as it exits the orifice 31, or other information, may be transmitted via the receiver 56 to the external device.

The vapor generating system 11 may further comprise a temperature sensor 50 (e.g., thermocouple, thermistor, optical, etc.) in communication with the fluid and in electrical communication with the controller unit 20. As the temperature sensor 50 may be located at various locations so long as the sensor 50 is in communication with the fluid, the sensor 50 may be positioned along the system to contact the fluid after it exits the heater 16, or after the fluid exits the pump 12, but before it enters the heater 16, or within or along the fluid reservoir 10. The temperature sensor 50 may be in wired or wireless communication with the controller unit 20 and/or with the receiver 56 such that the receiver 56 can wirelessly communicate that information to an external device. The temperature sensor 50 may also be in wired or wireless communication with the interface 54. If located at the exit at the heater 16, the temperature sensor 50 may be used to calibrate the heater 16 where the calibration process could involve the user setting the heater 16 to a specific temperature by sending a signal with the second driver 42, the temperature sensor 50 sending an analog-to-digital temperature value to the controller unit 20, and the user adjusting the temperature such that the second driver 42 values correspond to the specific temperatures.

In an alternative variation, the vapor generating system 11 may further comprise a pressure sensor 52 in communication with the fluid and in electrical communication with the controller unit 20. A pressure sensor 52 may be located such that it is in communication with the fluid after it exits the heater 16. For example, the pressure sensor 52 may be located such that it is in communication with the fluid after it exits the pump 12, but before it enters the heater 16, or within or along the fluid reservoir 10. The pressure sensor 52 may also be in wireless communication with the controller unit 20 as well as with the receiver 56 such that the receiver can wirelessly communicate that information to an external device. The pressure sensor 52 may also be configured such that it continuously or repeatedly communicates pressure readings to the flow controller 22 such that the flow controller 22 can update the speed of the pump 12 via the first driver 40 continuously or periodically, in real-time while the pump 12 is actuated. The pressure sensor 52 may be in communication with the pump 12 and may also be used to measure the pressure of the fluid as it exits the pump 12. The pressure sensor 52 may be used in addition to, or as an alternative to, the flow sensor 14 in the control and calibration modes.

In an alternative calibration mode, the pressure sensor 52 may produce an analog-to-digital value for a particular pump speed. This may be repeated for multiple speeds to produce an array of analog-to-digital values for different pressures corresponding to different speeds of the pump 12, which may be saved in the flow controller calibration look-up table 70. In an alternative control mode, user input may be communicated to the controller unit 20 using the interface 54 or the receiver 56, as described previously. The flow controller 22 may reference the flow controller calibration look-up table 70 to communicate with the first driver 40 to set the pump 12 to a speed that corresponds to the user input. The flow controller 22 may then, in real-time, collect information from the pressure sensor 52, such as the pressure of the fluid out of the pump 12. This information may be used to change the pump speed such that the pressure of the fluid as it exits the pump 12 is updated in real-time to correspond to the pressure saved in the flow controller calibration table 70 that correspond to the user input.

The vapor generating system 11 may further comprise a level sensor (not shown) in an alternative variation. The level sensor may be in communication with the fluid reservoir and the controller unit and may be used to measure the level of the fluid in the fluid reservoir. The level sensor may communicate to the controller unit 20 the level of the fluid within the fluid reservoir and this information may be optionally displayed to a user via the interface 54 or through an external device such as a smartphone or computer in communication with the controller unit 20 via the receiver 56. A level sensor may also be located within the tube 18 to determine the level of fluid within the tube. The level sensor may communicate to the controller unit 20 whether there is fluid within the tube 18. If there is a low level of fluid in the tube 18, the controller unit 20 may communicate to the first driver 40 to actuate the pump 12 at a low level to keep the fluid in the tube from draining back into the fluid reservoir 10.

The vapor generating system 11 may further comprise a current sensor 58 in communication with the heater 16 and the controller unit 20 in yet another variation. The current sensor 58 may be in communication with the heater coil 17. The current sensor 58 may be in wired or wireless communication with the controller unit 20 and/or with the receiver 56 such that the receiver can wirelessly communicate that information to an external device. The current sensor 58 may also be in wired or wireless communication with the heater controller 24, and/or with the interface 54. The current sensor 58 may be configured such that it continuously or repeatedly communicates current readings to the heater controller 24 such that the heater controller 24 can update the temperature of the heater 16 continuously or periodically, in real time while the pump 12 is actuated.

The flow sensor 14 may be a bidirectional flow sensor 68 in yet another variation. The bidirectional flow sensor 68 may be capable of measuring the fluid flow in the tube 18 in multiple directions and may be configured to detect conditions such as when air is in the tube 18, which may be an indicator that the tube 18 does not contain the fluid from the fluid reservoir 10. If the bidirectional flow sensor 68 detects that there is air in the tube 18, the flow controller 22 may communicate to the first driver 40 to actuate the pump 12 with sufficient torque to prevent fluid from draining from the tube 18 to the fluid reservoir 10.

The current sensor 58 and the controller unit 20 may be in electrical communication via an electrical conductor 60 such as a wire or cable. The temperature sensor 50 and the controller unit 20 may also be in electrical communication via an electrical conductor 62 such as a wire or cable. The pressure sensor 52 and the controller unit 20 may be in electrical communication via an electrical conductor 64 such as a wire or cable. The interface 54 and the controller unit 20 may be in electrical communication via an electrical conductor 66 such as a wire or cable.

Figure 7:
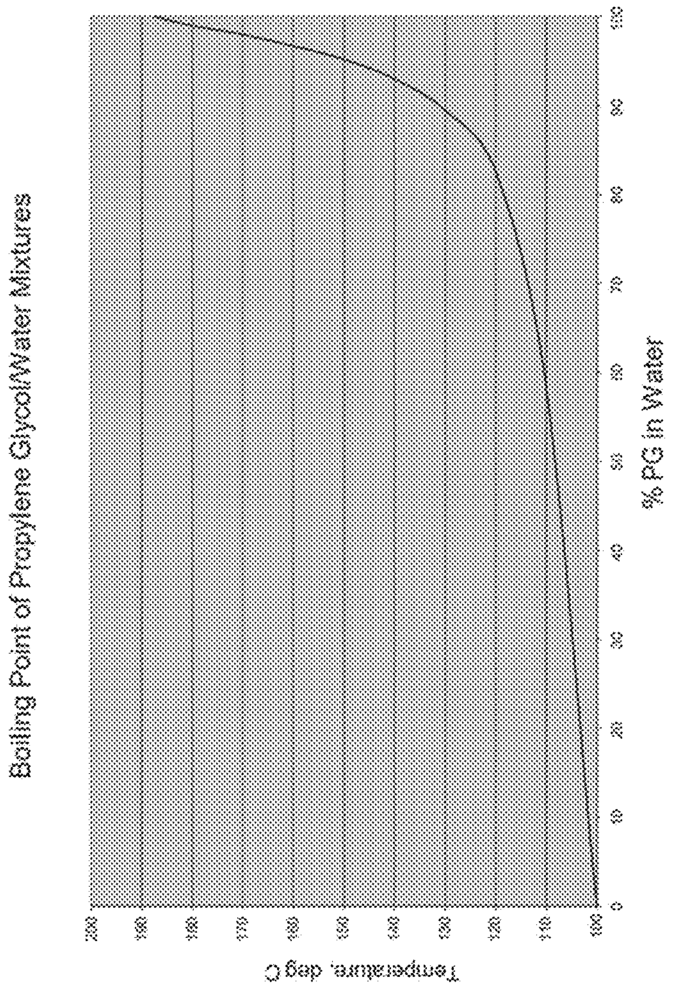
FIG. 7 shows a graph of the boiling point of propylene glycol and water mixtures in degrees Celsius as a function of the percentage of propylene glycol in the mixture.

While various fluids may be used with the system, one example of a useful fluid includes propylene glycol which may be optionally mixed with another fluid such as water to provide the fluid for vaporization. FIG. 7 shows a graph of the boiling point of propylene glycol and water mixtures in degrees Celsius as a function of the percentage of propylene glycol in the mixture. The fluid in the fluid reservoir 10 that is to be vaporized may be a propylene glycol and water mixture and depending upon the percentage of propylene glycol relative to water, the corresponding boiling point, as shown, may be used to initially set the heating parameters of the heater coil as well. The fluid may comprise triethylene glycol, monopropylene Glycol, or dipropylene glycol and purified water. The fluid may alternatively comprise other chemicals or mixtures.

The system 11 may accordingly be used with a manifold that can be configured in any number of configurations depending upon various factors such as the desired application, ventilation requirements, clean room configurations, etc. FIGS. 8A-8D show examples of different variations of a manifold assembly 80 which may fluidly coupled with the vapor generating system 11. While a single vapor generating system 11 is shown coupled to the various manifold configurations, multiple systems 11 may be optionally used simultaneously with a common manifold assembly 80. Other variations may include multiple vapor generating systems used with its own manifold assembly but in combination with additional assemblies.

The manifold may allow the vapor to cool and mix with air to form a stable fog at ambient temperature and pressure while avoiding fully condensing back into a fluid. The manifold 80 may comprise a series of removably detachable tubes 82 that can be configured into various shapes and positions. The manifold tubes 82 may be connected via a plurality of manifold connectors 84 which may be hollow tubes with larger diameters than those of the manifold tubes 82 such that the manifold tubes 82 can be fitted inside of the manifold connectors 84.

Figure 8B:
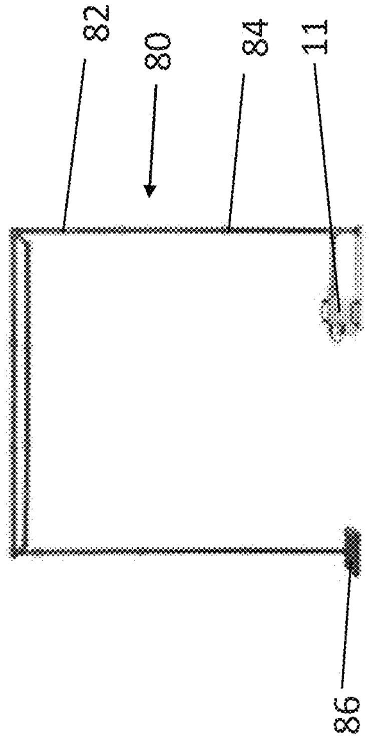
FIGS. 8A-8D show variations of a manifold in fluid communication with the vapor generating system.
Figure 8D:
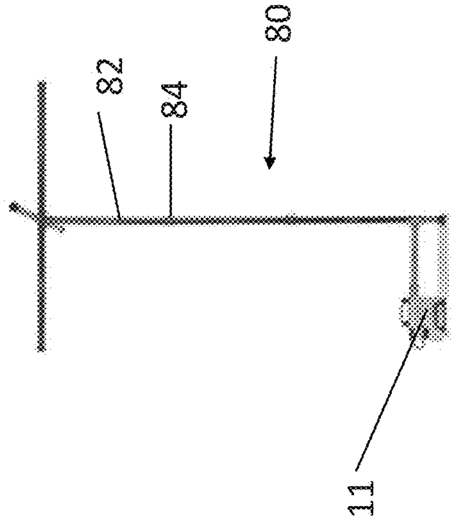
Figure 8A:
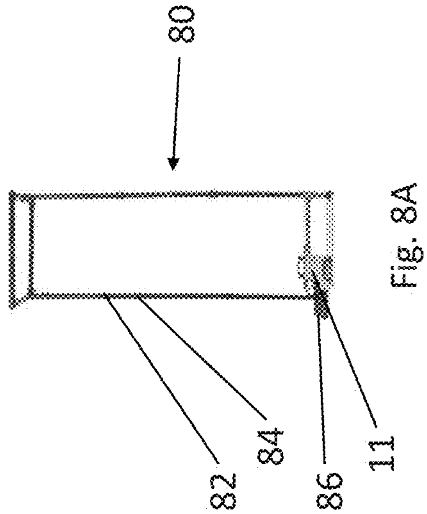
Figure 8C:
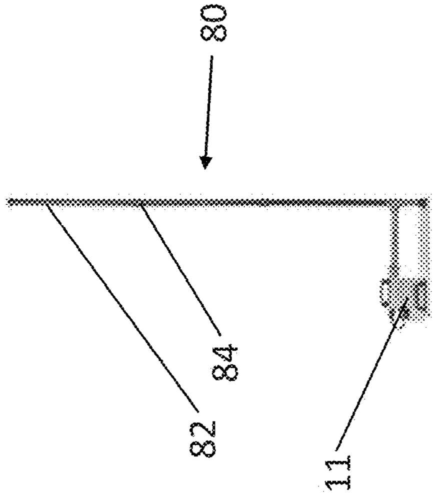

An alternative embodiment of the manifold connector 84 can have three tubular openings that are each perpendicular to each other to be used as a corner attachment piece, as illustrated in FIGS. 8A and 8B. Another alternative embodiment of the manifold connector 84 can have four tubular openings such that the openings are spaced ninety degrees apart from each other in the same plane, as illustrated in FIG. 8D. The manifold connector 84 can take a variety of alternative shapes such that manifold tubes 82 can be removably secured in a variety of different shapes, positions, and orientations. The manifold 80 may further comprise a manifold base 86, which may comprise a flat surface to help stabilize the manifold 80 when it is positioned against a floor or wall. The manifold base 86 may alternatively form an angle such that the manifold base can be balanced against the corner of a wall, table, or other fixture. The manifold base 86 may further comprise a tubular opening such that a manifold tube 82 can be fitted within the tubular opening. The manifold base 86 may further comprise holes or other openings such that smoke, fog, or haze can exit the manifold base without being collected in the base 86. The manifold base 86 may be made of rubber, plastic, or another material with a coefficient of friction such that the manifold base 86 will not slide across a floor or wall. In an alternative embodiment, the manifold tubes 82 may have a narrow end and a wide end such that a narrow end of one tube can be fitted inside of the wide end of another tube, removing the need for manifold connectors 84. In another alternative embodiment, the manifold connectors 84 may further comprise removably securable locking mechanisms such that the manifold tubes 82 may be removably locked in place inside of the manifold connectors 84.

Figure 9A:
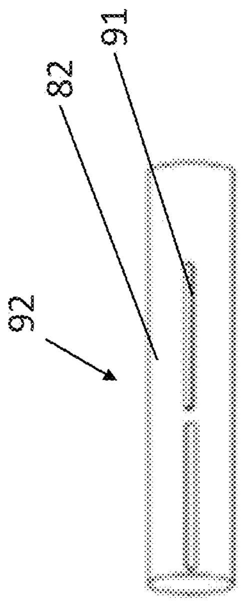
FIGS. 9A-9E show isometric and cross-sectional views of a manifold in a slotted configuration, and a representation of the corresponding airflow patterns.
Figure 9B:
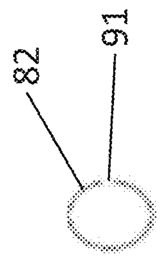
Figure 9C:
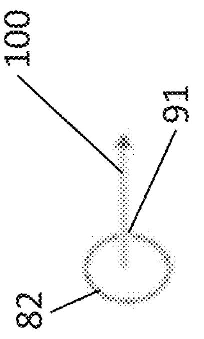
Figure 9D:
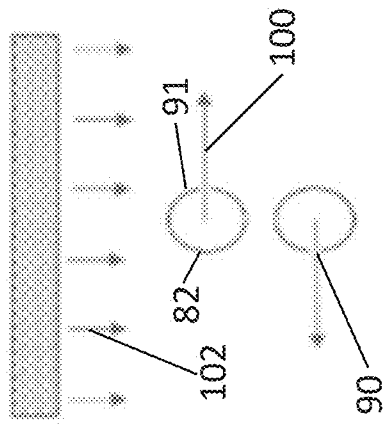
Figure 9E:
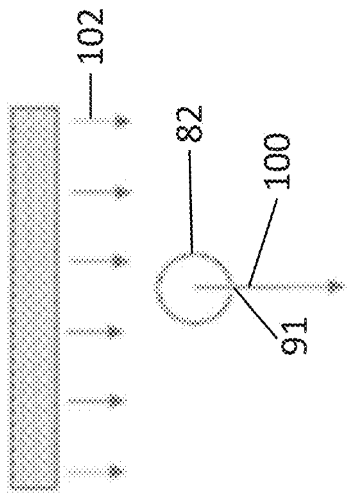

FIGS. 9A-9E show isometric and cross-sectional views of an example of a manifold tubing defining one or more slotted openings along portions of a length of the tubing, and a representation of the fog, smoke, or haze airflow 100 and the environment airflow 102. In this configuration, the manifold tube 82 may have an elongated orifice, or in other words, a slot 91, along all or part of the length of the manifold tube 82, forming a slotted manifold 92 to directionally provide the vapor through an elongated channel. FIG. 9A illustrates an isometric view of a slotted manifold 92. FIG. 9B illustrates a cross-sectional view of the slotted manifold 92 and FIG. 9C illustrates a cross-sectional view of the slotted manifold 92 with the fog, smoke, or haze airflow 100 as it exits the manifold tube 82 through the slot 91. The manifold tube 82 may be oriented such that the fog, smoke, or haze airflow 100 exits the manifold tube 82 via the manifold slot 91 in a direction that is perpendicular to the environment airflow 102. The environment airflow 102 may be the airflow of the fluid in the environment that is being tested, which may be the airflow below an HVAC unit. FIG. 9D illustrates a manifold tube 82 that is oriented in such a manner such that the fog, smoke, or haze airflow 100 is perpendicular to the environment airflow 102. FIG. 9E illustrates a manifold tube 82 that is oriented where the fog, smoke, or haze airflow 100 is not perpendicular to the environment airflow 102.

Figure 10E:
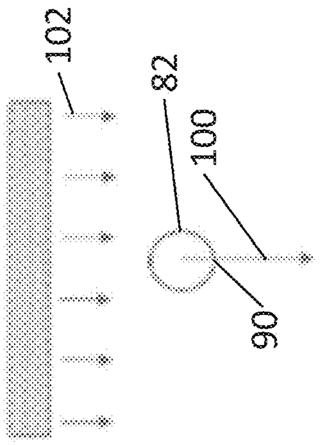
FIGS. 10A-10E show isometric and cross-sectional views of a manifold in a simple configuration, and a representation of the corresponding airflow patterns.
Figure 10D:
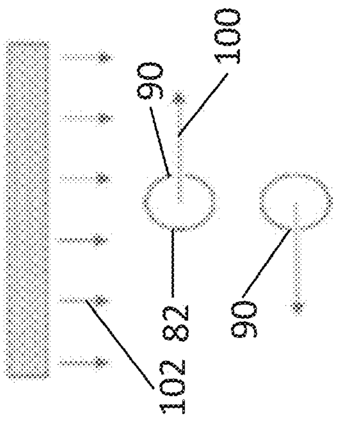
Figure 10A:
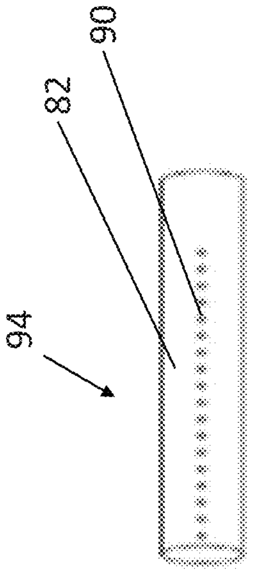
Figure 10C:
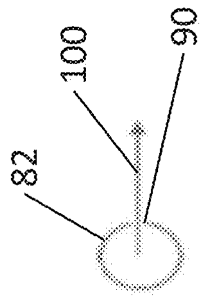
Figure 10B:
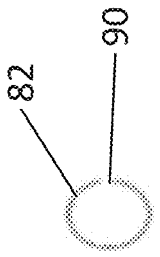

FIGS. 10A-10E show isometric and cross-sectional views of another variation of a manifold tubing in a simple configuration, and a representation of the fog, smoke, or haze airflow 100 and the environment airflow 102. In this configuration, the manifold tube 82 may have a series of orifices 90 in a linear orientation along all or a portion of the length of the manifold tube 82. FIG. 10A illustrates an isometric view of a simple manifold 94. FIG. 10B illustrates a cross-sectional view of the simple manifold 94. FIG. 10C illustrates a cross-sectional view of the simple manifold 94 with the fog, smoke, or haze airflow 100 as it exits the manifold tube 82 through the orifices 90. The manifold tube 82 may be oriented such that the fog, smoke, or haze airflow 100 exits the manifold tube 82 via the manifold orifices 90 in a direction that is perpendicular to the environment airflow 102. The environment airflow 102 may be the airflow of the fluid in the environment that is being tested, which may be the airflow below an HVAC unit. FIG. 10D illustrates a manifold tube 82 that is oriented such that the fog, smoke, or haze airflow 100 is perpendicular to the environment airflow 102. FIG. 10E illustrates a manifold tube 82 that is oriented where the fog, smoke, or haze airflow 100 is not perpendicular to the environment airflow 102.

Figure 11A:
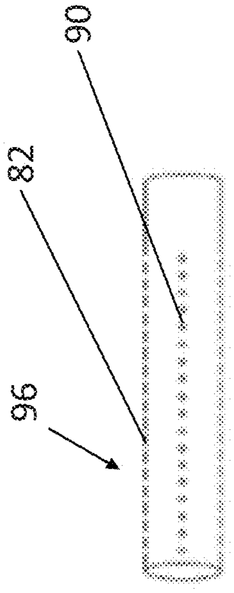
FIGS. 11A-11E show isometric and cross-sectional views of a manifold in a four-orifice or quad-style configuration, and a representation of the corresponding airflow patterns.
Figure 11B:
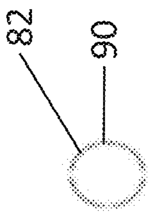
Figure 11C:
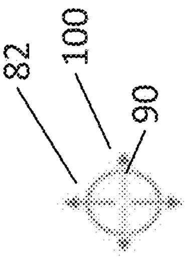
Figure 11D:
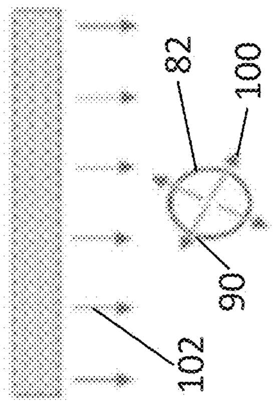
Figure 11E:
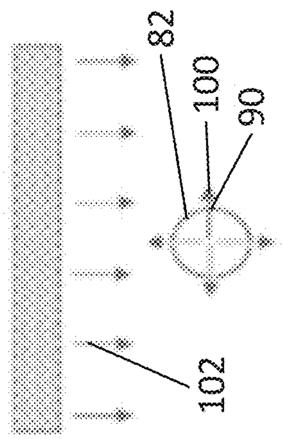

FIGS. 11A-11E show isometric and cross-sectional views of yet another variation of a manifold tubing in a multiple-orifice or quad style configuration, and a representation of the fog, smoke, or haze airflow 100 and the environment airflow 102. In this configuration, the manifold tube 82 may have a series of orifices in a linear fashion along all or part of the length of the manifold tube 82, on four locations along the tube. FIG. 11A illustrates an isometric view of a multiple-orifice manifold 96. FIG. 11B illustrates a cross-sectional view of the multiple-orifice manifold 96. FIG. 11C illustrates a cross-sectional view of the multiple-orifice manifold 96 with the airflow 100 of the fog, smoke, or haze illustrated as it exits the manifold tube 82. In this configuration, the manifold tube 82 can be oriented in any direction. FIG. 11D illustrates a manifold tube 82 such that the fog, smoke, or haze airflows 100 are not all perpendicular to the environment airflow 102 to show that the manifold tube 82 can be oriented in any direction in this configuration. FIG. 11E illustrates another manifold tube 82 that is oriented differently from that in FIG. 11D, but which is still oriented to show that the manifold tube 82 can be oriented in any direction in this configuration.

Figure 12D:
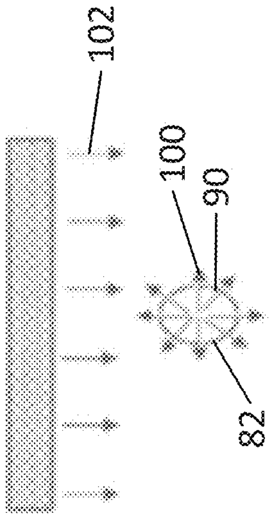
FIGS. 12A-12D show isometric and cross-sectional views of a manifold in an eight-orifice configuration, and a representation of the corresponding airflow patterns.
Figure 12A:
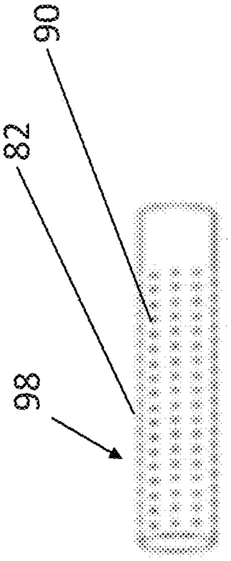
Figure 12C:
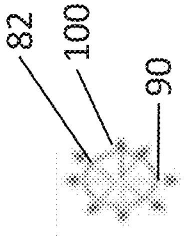
Figure 12B:
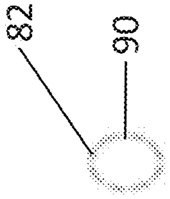

FIGS. 12A-12D show isometric and cross-sectional views of yet another variation of a manifold tubing in a multiple-orifice configuration, and a representation of the fog, smoke, or haze airflow 100 and the environment airflow 102. In this configuration, the manifold tube 82 may have a series of orifices in a linear fashion along all or part of the length of the manifold tube 82, on eight locations along the tube. FIG. 12A illustrates an isometric view of an eight-orifice manifold 98. FIG. 12B illustrates a cross-sectional view of the eight-orifice manifold 98. FIG. 12C illustrates a cross-sectional view of the eight-orifice manifold 98 with the airflow 100 of the fog, smoke, or haze illustrated as it exits the manifold tube 82. In this configuration, the manifold tube 82 can be oriented in any direction. FIG. 12D illustrates a manifold tube 82 such that the fog, smoke, or haze airflows 100 are not all perpendicular to the environment airflow 102, but which is still oriented to show that the manifold tube 82 can be oriented in any direction in this configuration.

While each of the embodiments herein are described as having a particular set of features or components, it is intended that any one or more features or components of any one embodiment may be combined with any one or more features or components of any one or more of the other embodiment to result in various combinations of the system. For example, any one of the embodiments of the vapor generating system may incorporate any number of other features described in any one of the other embodiments and such a vapor generating system may be combined in any combination with any of the manifold configurations and/or manifold tubing combinations, as desired or as practicable.

The applications of the devices and methods discussed above are not limited to the airflow visualization but may include any number of further applications. Modification of the above-described assemblies and methods for carrying out the invention, combinations between different variations as practicable, and variations of aspects of the invention that are obvious to those of skill in the art are intended to be within the scope of the claims.

What is claimed is:

1. A vapor generating system, comprising:

a fluid reservoir configured for receiving a volume of fluid to be vaporized;

a pump in fluid connection with the fluid reservoir;

a heater in communication with the fluid from the fluid reservoir;

a controller unit in communication with the pump and the heater, the controller unit comprising a flow controller and a heater controller; and a flow sensor in communication with the flow controller for measuring a fluid flow rate of the fluid from the fluid reservoir;

wherein the flow controller is configured to actuate the pump to provide a predetermined fluid flow rate from the fluid reservoir whereby the predetermined fluid flow rate is dependent upon a selection of the fluid having a selected boiling point and a selected vapor intensity, and wherein the heater controller is configured to actuate the heater to provide a predetermined heater temperature to the fluid whereby the predetermined heater temperature is dependent upon the selection of the fluid having the selected boiling point and the selected vapor intensity at the predetermined flow rate.

2. The system of claim 1 wherein the flow controller receives information from the flow sensor and actuates the pump based on that information in real time.

3. The system of claim 1 wherein the controller unit further comprises a first driver which is in communication with the pump and the flow controller.

4. The system of claim 3 wherein the first driver comprises a pulse-width modulation driver.

5. The system of claim 1 wherein the controller unit further comprises a second driver which is in communication with the heater controller and the heater.

6. The system of claim 5 wherein the second driver comprises a pulse-width modulation driver.

7. The system of claim 1 further comprising an interface in communication with the controller unit for selecting the fluid type and the vapor intensity.

8. The system of claim 1 further comprising a manifold in communication with the fluid reservoir.

9. The system of claim 1 further comprising a current sensor in communication with the heater.

10. The system of claim 1 wherein the flow sensor further comprises a bidirectional flow sensor in communication with the fluid reservoir.

11. The system of claim 1 wherein the controller unit further comprises a receiver configured for wireless communication.

12. The system of claim 1 further comprising a pressure sensor in communication with the fluid from the fluid reservoir.

13. The system of claim 1 further comprising a temperature sensor in communication with the fluid from the fluid reservoir.

14. The system of claim 1 further comprising a level sensor in communication with the fluid reservoir.

15. A method of generating vapor, comprising:

receiving a first selection by a user of a fluid having a selected boiling point and a second selection of the fluid having a selected vapor intensity;

actuating a pump in fluid connection with a fluid reservoir such that the fluid within the fluid reservoir is controlled via a flow controller within a controller to flow at a predetermined fluid flow rate which is dependent upon the first selection of the fluid having the selected boiling point and the second selection of the fluid having the selected vapor intensity;

actuating a heater in communication with the fluid reservoir such that the heater is controlled via a heater controller within the controller to provide a predetermined heater temperature which is dependent upon the first selection of the fluid having the selected boiling point and the second selection of the fluid having the selected vapor intensity; and measuring the fluid flow rate via a flow sensor in communication with the fluid reservoir and the flow controller while the fluid is vaporized at the predetermined fluid flow rate and the predetermined heater temperature.

16. The method of claim 15 wherein actuating the pump comprises activating a first driver in communication with the pump and the flow controller.

17. The method of claim 16 wherein activating the first driver comprises activating a pulse-width modulation driver.

18. The method of claim 15 wherein activating the heater comprises activating a second driver in communication with the heater and the heater controller.

19. The method of claim 18 wherein activating the second driver comprises activating a pulse-width modulation driver.

20. The method of claim 15 wherein receiving the selection comprises receiving the selection from the user via an interface in communication with the controller unit.

21. The method of claim 15 further comprising distributing a vaporized fluid via a manifold in communication with the fluid reservoir.

22. The method of claim 15 further comprising measuring a current supplied to the heater using a current sensor in communication with the heater.

23. The method of claim 15 further comprising measuring the fluid flow rate via a bidirectional flow sensor in communication with the fluid reservoir.

24. The method of claim 15 further comprising communicating wirelessly with the controller via a receiver in communication with the controller.

25. The method of claim 15 further comprising measuring a pressure of the fluid using a pressure sensor in communication with the fluid from the fluid reservoir.

26. The method of claim 15 further comprising measuring a temperature of the fluid using a temperature sensor in communication with the fluid from the fluid reservoir.

27. The method of claim 15 further comprising measuring a level of the fluid using a level sensor in communication with the fluid reservoir.

28. A vapor generating system, comprising:

a fluid reservoir configured for receiving a volume of fluid to be vaporized;

a pump in fluid connection with the fluid reservoir;

a heater in communication with the fluid from the fluid reservoir;

a controller unit in communication with the pump and the heater, the controller unit comprising a flow controller and a heater controller; and wherein the flow controller is configured to actuate the pump to provide a predetermined fluid flow rate from the fluid reservoir whereby the predetermined fluid flow rate is dependent upon a selection of the fluid having a selected boiling point, and wherein the heater controller is configured to actuate the heater to provide a predetermined heater temperature to the fluid whereby the predetermined heater temperature is dependent upon the selection of a selected vapor intensity at the predetermined flow rate.

* * * * *